(12) United States Patent
Baralon (10) Patent No.: US 10,451,005 B2
(45) Date of Patent: Oct. 22, 2019

(54) GAS TURBINE ENGINE

(71) Applicant: ROLLS-ROYCE plc, London (GB)

(72) Inventor: Stephane M M Baralon, Derby (GB)

(73) Assignee: ROLLS-ROYCE plc, London (GB)

( * ) Notice: Subject to any disclaimer, the term of this patent is extended or adjusted under 35 U.S.C. 154(b) by 463 days.

(21) Appl. No.: 15/333,624

(22) Filed: Oct. 25, 2016

(65) Prior Publication Data

US 2017/0145959 A1    May 25, 2017

(30) Foreign Application Priority Data

Nov. 23, 2015   (GB) .................................. 1520620.4

(51) Int. Cl.
| | |
|---|---|
| *F02K 3/06* | (2006.01) |
| *F01D 9/04* | (2006.01) |
| *F02C 7/20* | (2006.01) |
| *B64D 27/26* | (2006.01) |

(52) U.S. Cl.
CPC .................. *F02K 3/06* (2013.01); *F01D 9/04* (2013.01); *F02C 7/20* (2013.01); *B64D 27/26* (2013.01); *F05D 2210/12* (2013.01); *F05D 2220/36* (2013.01); *F05D 2250/30* (2013.01)

(58) Field of Classification Search
CPC ...... B64D 27/26; B64D 2027/262; F02K 3/06
See application file for complete search history.

(56) References Cited

U.S. PATENT DOCUMENTS

| | | | | |
|---|---|---|---|---|
| 9,540,938 | B2* | 1/2017 | Topol | F01D 17/162 |
| 9,869,191 | B2* | 1/2018 | Gallagher | F02K 3/06 |
| 2004/0258520 | A1* | 12/2004 | Parry | F01D 5/10 |
| | | | | 415/209.1 |
| 2012/0288365 | A1* | 11/2012 | Bagnall | F01D 5/141 |
| | | | | 415/208.1 |
| 2015/0330309 | A1* | 11/2015 | Bagnall | F02C 6/08 |
| | | | | 60/785 |

FOREIGN PATENT DOCUMENTS

| | | |
|---|---|---|
| DE | 102009042242 A1 | 4/2011 |
| EP | 1493900 A2 | 1/2005 |

OTHER PUBLICATIONS

Mar. 2, 2016 Search Report issued in British Patent Application No. GB1520620.4.

* cited by examiner

*Primary Examiner* — Gerald L Sung
(74) *Attorney, Agent, or Firm* — Oliff PLC (57) ABSTRACT

A gas turbine engine comprising in flow series: a fan; a series of outlet guide vanes; and a bifurcation. The outlet guide vanes are more densely distributed in a region circumferentially aligned with the bifurcation than in a region circumferentially offset from the bifurcation.

12 Claims, 6 Drawing Sheets

GAS TURBINE ENGINE

TECHNICAL FIELD

The present disclosure relates to a bifurcation for a gas turbine engine and/or a gas turbine engine.

BACKGROUND

Figure 1:
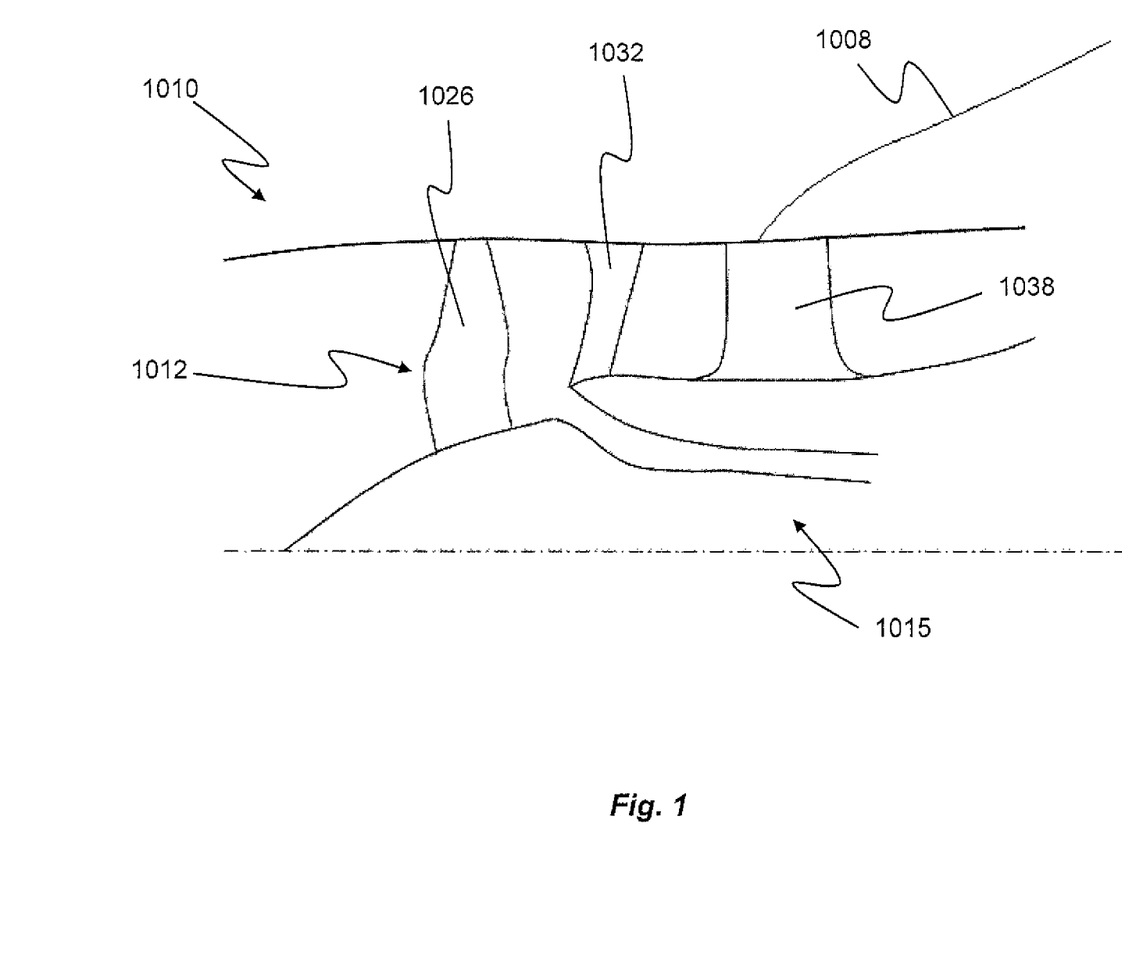
FIG. 1 illustrates a section of a portion of a gas turbine engine of the prior art.

Turbofan gas turbine engines (which may be referred to simply as 'turbofans') are typically employed to power aircraft. Turbofans are particularly useful on commercial aircraft where fuel consumption is a primary concern. Referring to FIG. 1, typically a turbofan gas turbine engine 1010 will comprise an axial fan 1012 driven by an engine core 1015. The engine core is generally made up of one or more turbines which drive respective compressors via coaxial shafts. The fan is usually driven directly off an additional lower pressure turbine in the engine core.

The turbofan gas turbine engine 1010 is generally provided with outlet guide vanes (OGVs) 1032 downstream of the fan 1012 for straightening flow from the fan. Typically one or two bifurcations 1038 are provided downstream of the OGVs between the inner and outer walls of the bypass duct. The bifurcations include aerodynamically shaped fairings around the pylon structure for the purpose of encasing and directing electrical connections. Usually one bifurcation is positioned between the engine core 1015 and the outer casing at a position near a pylon 1008 that mounts the engine to the wing of an aircraft. If two bifurcations are provided, the second bifurcation is generally positioned diametrically opposite the bifurcation shown in FIG. 1.

However, the bifurcation provides a substantial and undesirable blockage to the flow downstream of the OGVs. This means that part of the flow from the OGVs stagnates at the bifurcation leading edge. The stagnated flow reaches a high static pressure equal to the incoming total pressure, also called stagnation pressure. The remaining flow from the OGVs flows around the bifurcation which results in acceleration, hence a reduction in pressure. The resulting high leading edge stagnation pressure and the low pressure around the area of high pressure bring a significant peak-to-peak variation in the static pressure field seen from the OGV trailing-edge.

Figure 2A:
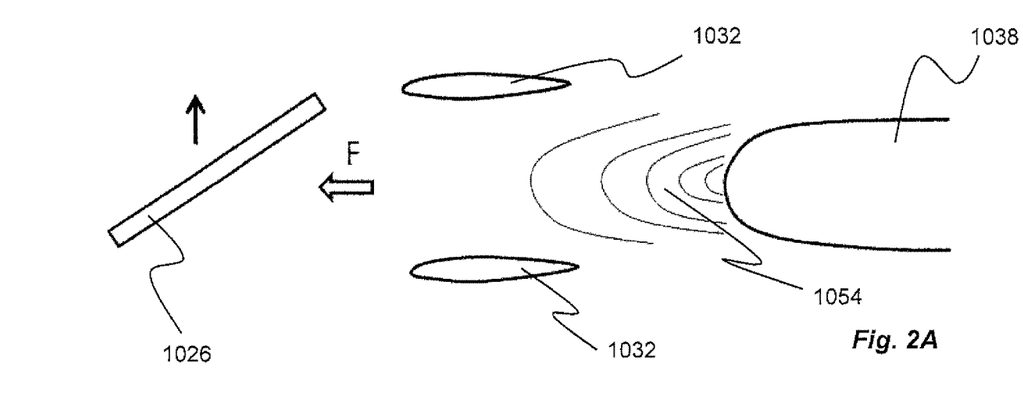
FIG. 2A illustrates a partial plan view of a fan blade, outlet guide vanes and bifurcation of the engine of FIG. 1.
Figure 2B:
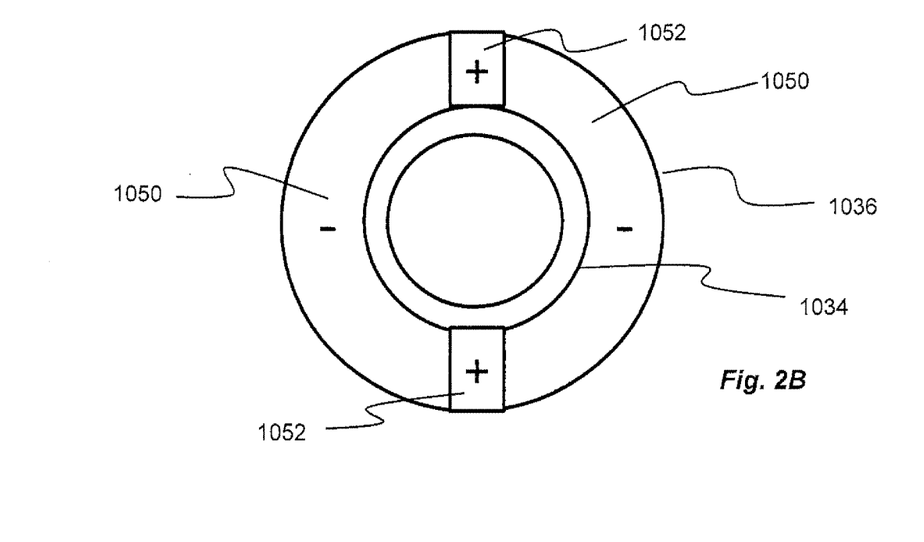
FIG. 2B illustrates a static pressure profile circumferentially around a bypass duct of the engine of FIG. 1 in the region of the bifurcation

This problem is illustrated in FIGS. 2A and 2B. Referring to FIG. 2A, the static pressure field is indicated at 1054 and the resulting force on the fan is indicated by arrow F referred to as "forcing" in the art. Forcing on the fan blades causes undesirable fan blade vibration. Referring to FIG. 2B, the region between the bifurcation 1038 and the OGVs 1032 (both shown in FIG. 2A) is illustrated, the region being defined by an outer casing 1036 and an inner casing 1034. As can be seen in FIG. 2B, an area of high static pressure 1052 is formed in the region of the two bifurcations, and a region of low pressure 1050 is formed between the two bifurcations.

One method of addressing this problem is to alter the stagger angle and camber of the OGVs. When the OGVs are angled and cambered to deliver a flow guided around but close to the bifurcation, the OGVs mask none of the static pressure field. This arrangement of OGVs is often referred to as "transparent". This is a poor case from a rotor forcing view point because the rotor sees the entire static pressure field variation. The static pressure field can be masked, often referred to as an "opaque" arrangement, by altering the camber and the stagger angle of the OGVs to deliver a flow direction that is angled further away from the bifurcation than the "transparent" arrangement. The "opaque" arrangement is better than the "transparent" arrangement from a forcing view point, but suffers from increased aerodynamic losses. Generally, gas turbine engines of the prior art seek a balance between the reduced forcing of the "opaque" arrangement and the improved aerodynamic performance of the "transparent" arrangement.

SUMMARY

The present disclosure seeks to provide a gas turbine engine having an improved balance between minimised forcing on the fan blades and maximised aerodynamic efficiency of flow exiting the OGVs.

In a first aspect there is provided a gas turbine engine comprising in flow series: a fan; a series of outlet guide vanes; and a bifurcation, wherein the outlet guide vanes are more densely distributed in a region corresponding to a circumferential position of the bifurcation than in a region corresponding to a circumferential position spaced from the bifurcation.

The region corresponding to the position of the bifurcation may be a region that has a circumferential extent equal or greater than the circumferential extent of the bifurcation, and a region that is substantially circumferentially aligned or circumferentially overlapping with the bifurcation.

In exemplary embodiments, the circumferential extent of the region corresponding to the position of the bifurcation may have a circumferential extent equal to or greater than the extent of the bifurcation and equal to or less than three times that of the circumferential extent of the bifurcation, for example equal to or less than twice that of the circumferential extent of the bifurcation.

The outlet guide vanes positioned in the region corresponding to the position of the bifurcation may have a shorter chord length than the remainder of the outlet guide vanes.

The outlet guide vanes having a shorter chord length (referred to from hereon in as smaller outlet guide vanes) may only be provided in the region corresponding to the bifurcation.

One or a plurality of smaller outlet guide vanes may be positioned between two larger outlet guide vanes in the region of the bifurcation, the smaller outlet guide vanes having a shorter chord length than the larger outlet guide vanes.

Reference to a smaller outlet guide vane refers to the dimensions of the outlet guide vane with respect to the larger outlet guide vane, and vice versa.

The one or more smaller outlet guide vanes may have a chord length equal to or between a half and a quarter of the chord length of the larger outlet guide vanes.

The one or more smaller outlet guide vanes may have a chord length equal to about one third of the chord length of the larger outlet guide vanes.

The one or more smaller outlet guide vanes may be narrower than the larger outlet guide vanes.

The maximum circumferential width of the one or more smaller outlet guide vanes may be equal to or between one quarter and three quarters of the maximum radial width of the larger outlet guide vanes.

The larger outlet guide vanes may have a rearward camber angled to an axis parallel to the longitudinal axis of the gas turbine engine, the angle of the rearward camber from said axis may be greater than the angle, from the axis parallel to the longitudinal axis, of a streamline flow contouring the bifurcation.

The larger outlet guide vanes may have a rearward camber angled to the longitudinal direction or axis of the gas turbine engine. The angle of the rearward camber from the longitudinal direction may be greater than the angle of a streamline flow contouring the bifurcation in the plane that is perpendicular to the radial direction.

The larger outlet guide vanes may have a rearward camber angled at twice the angle of the streamline flow contouring the bifurcation when measured from an axis parallel to the longitudinal axis of the gas turbine engine.

The smaller outlet guide vanes may be positioned between two larger outlet guide vanes that have an opaque arrangement. One of the two larger outlet guide vanes may be over-cambered compared to the remaining outlet guide vanes (e.g. those circumferentially distal to the bifurcation) and the other larger outlet guide vane may be under-cambered compared to the remaining outlet guide vanes (e.g. those circumferentially distal to the bifurcation).

At least one of the smaller outlet guide vanes may be arranged to encourage flow along a flow line defined by at least one larger outlet guide vane. That is, at least one of the smaller outlet guide vanes may be arranged to encourage flow to follow the angle of the larger outlet guide vane upon exiting a passage defined by the larger outlet guide vane and the at least one smaller outlet guide vane.

The smaller outlet guide vane may be arranged to encourage attached flow through a passage defined by the larger outlet guide vane and the smaller outlet guide vane.

At least two smaller outlet guide vanes may be positioned between the larger outlet guide vanes.

One of the smaller outlet guide vanes may be arranged to encourage flow along a flow line defined by one of the larger outlet guide vanes, and one of the other smaller outlet guide vanes may be arranged to encourage flow along a flow line defined by the other larger outlet guide vane.

At least three smaller outlet guide vanes may be positioned between the larger outlet guide vanes.

The three smaller outlet guide vanes may be arranged so as to encourage flow along a flow line defined by the two larger outlet guide vanes, and a flow line on each side of the bifurcation contouring the bifurcation.

The camber of the outlet guide vanes in a region corresponding to the position of the bifurcation may be such that flow exiting the passage is at an angle less than twice that of the angle of a streamline that contours the bifurcation.

At least four outlet guide vanes may be provided in the region corresponding to the position of the bifurcation. For example, at least five outlet guide vanes may be provided in the region corresponding to the position of the bifurcation.

In a second aspect there is provided a gas turbine engine comprising in flow series a fan, a series of outlet guide vanes, and a bifurcation. The outlet guide vanes positioned circumferentially either side of the bifurcation are opaquely arranged (i.e. have a stagger angle and camber that masks the static pressure field immediately upstream of the bifurcation from the fan). One or more outlet guide vanes having a shorter chord length than the other outlet guide vanes of the gas turbine engine are positioned between the opaquely arranged outlet guide vanes to encourage flow to remain attached to the opaquely arranged outlet guide vanes.

The gas turbine engine of the second aspect may have one or more features of the gas turbine engine of the first aspect.

DESCRIPTION OF DRAWINGS

The invention will now be described, by way of example only, with reference to the accompanying drawings in which.

DETAILED DESCRIPTION

Figure 3:
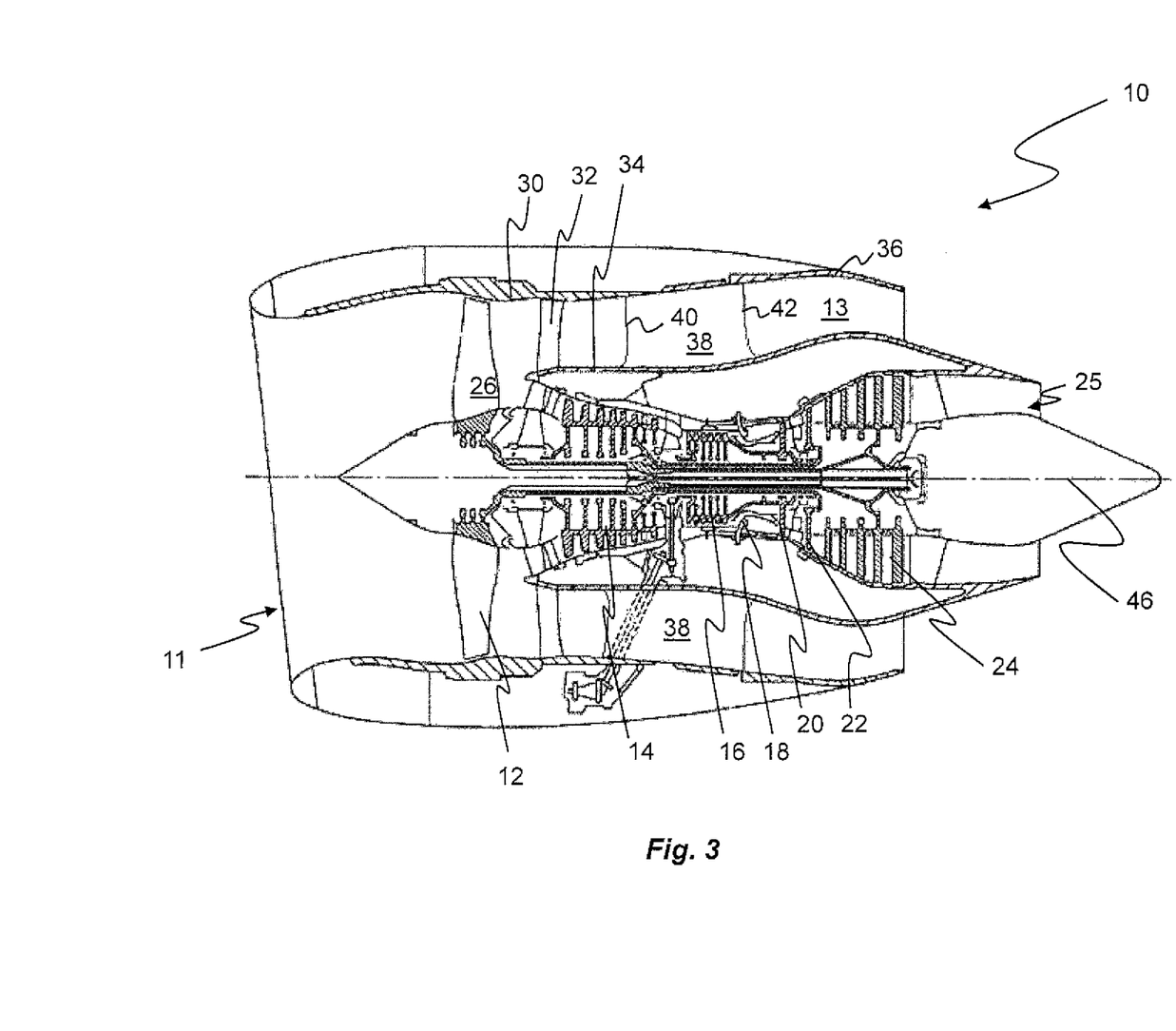
FIG. 3 illustrates a cross section of a gas turbine engine.

With reference to FIG. 3 a bypass gas turbine engine is indicated at 10. The engine 10 comprises, in axial flow series, an air intake duct 11, a fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts. The working fluid, which has reduced in pressure and temperature, is then expelled through the exhaust nozzle 25 generating the remainder of the engine thrust.

The intake fan 12 comprises an array of radially extending fan blades 26 that are mounted to the shaft. The intake fan 12 is circumferentially surrounded by a structural member in the form of a fan casing 30. Outlet guide vanes (OGVs) 32 are positioned downstream of the intake fan 12. In the present embodiment the OGVs support the fan casing, but in alternative embodiments, the OGVs may not provide such a supporting function (e.g. in smaller engines). The OGVs are primarily provided to straighten the flow from the intake fan 12. A series of OGVs are provided in the bypass duct 13 and are spaced circumferentially around the engine core. An inner casing 34 and an outer casing 36 (part of which is defined by the fan casing 30) define the bypass duct 13, and the OGVs extend from the inner casing to the outer casing.

A bifurcation 38 is positioned downstream of the OGVs. The bifurcation is provided for mounting of the fan case and also for the purpose of encasing and directing electrical connections and service pipes. In the present embodiment, two bifurcations 38 are provided at diametrically opposed positions.

The bifurcation 38 has a leading edge 40 and a trailing edge 42. The bifurcation has an aerofoil shape. That is, the bifurcation 38 has two axial sides extending between the leading and the trailing edge, the two axial sides being connected by a curved surface in the region of the leading edge. The bifurcation extends between the inner casing 34 and the outer casing 36, so as to extend between the core and a pylon (not shown) that connects the engine to the wing. In this way electrical components and various service pipes can be efficiently routed to the engine.

Figure 5:
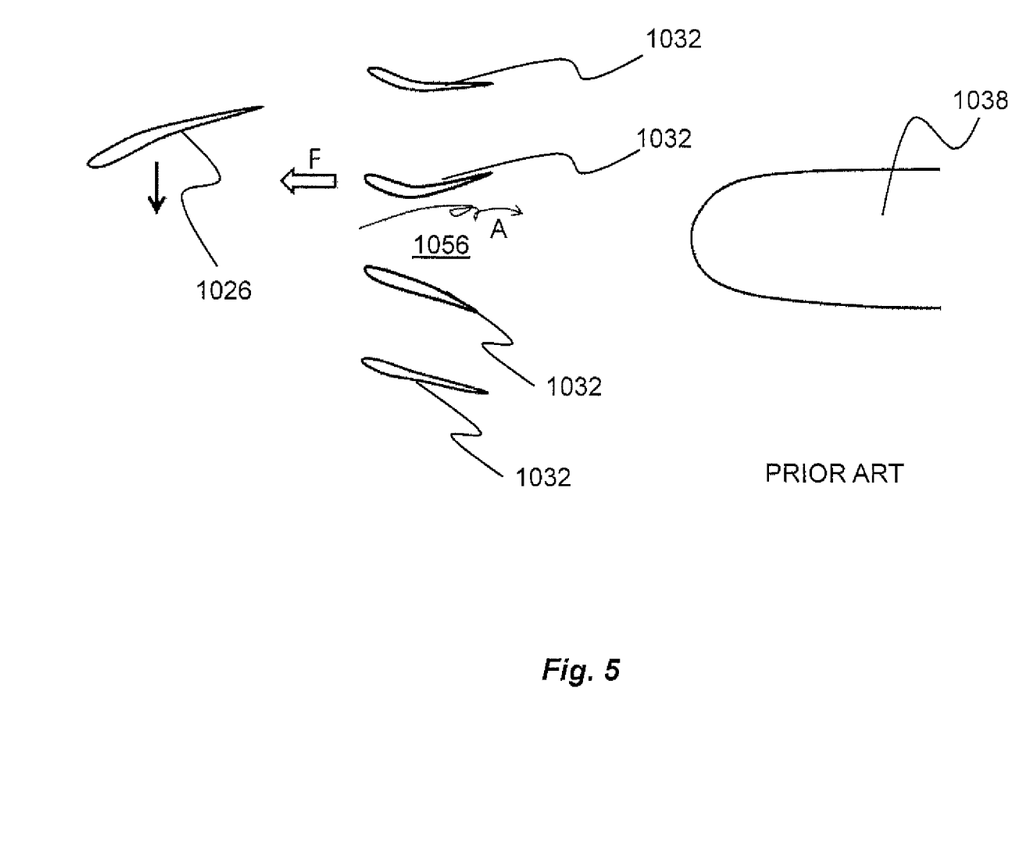
FIG. 5 illustrates a partial plan view of the fan blade, outlet guide vanes and bifurcation of a gas turbine engine of the prior art.

Referring now to FIG. 5, for comparison purposes an arrangement of a gas turbine engine having outlet guide vanes in the region of the bifurcation (i.e. in an axially extending section of the engine having circumferential extents near and including the bifurcation) with a large camber and stagger angle is shown. Arrow A illustrates a flow line of air through a passage 1056 defined by two adjacent OGVs 1032, one over-cambered at the upper end of the passage, one under-cambered at the lower-end of the passage. The arrow A illustrates that the flow through the passage 1056 is stalled due to the very large diffusion experienced by the flow in this passage. This high diffusion is the result of the combination of a high diffusing area ratio between the passage OGV leading and trailing edges and the adverse pressure gradient caused by the bifurcation leading edge stagnation pressure. This means that although the OGVs advantageously mask the fan blade from the static pressure field immediately upstream of the bifurcation, the aerodynamic efficiency of the gas turbine engine is substantially reduced.

Figure 4:
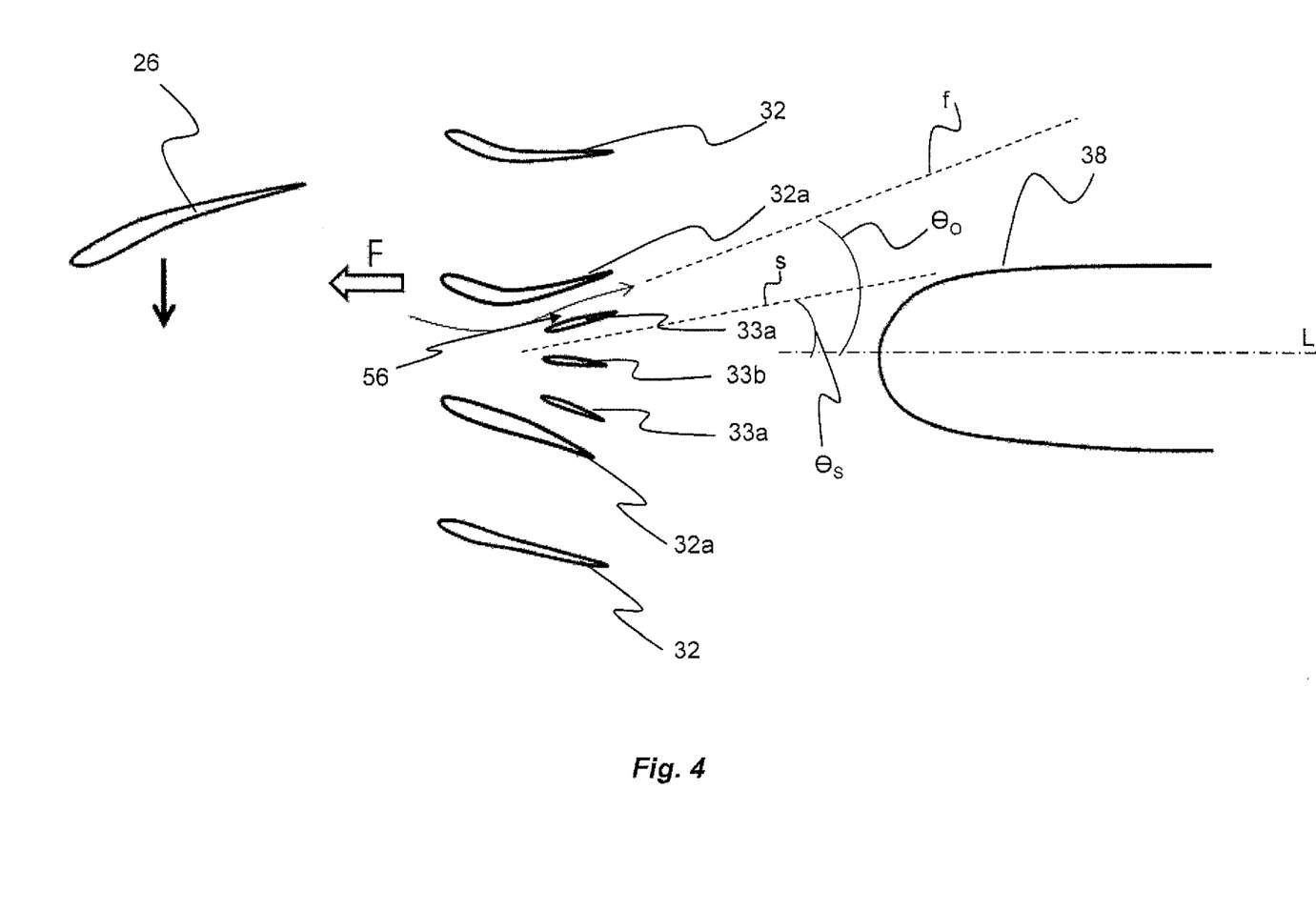
FIG. 4 illustrates a partial plan view of a fan blade, outlet guide vanes and a bifurcation of the engine of FIG. 3.

Referring now to FIG. 4, the arrangement of the outlet guide vanes 32, 32a, 33a, 33b and the bifurcation 38 of the gas turbine engine of FIG. 3 is shown. The outlet guide vanes 32a, 33a, 33b provided in a circumferential region corresponding to the position of the bifurcation 38 (e.g. a circumferential region substantially circumferentially aligned with the bifurcation) are more densely distributed than the outlet guide vanes in a region corresponding to a position away from the bifurcation. The OGVs 32, 32a, 33a and 33b have an aerofoil shape.

In the present embodiment, five outlet guide vanes (OGVs) 32a, 33a, 33b are provided in the region corresponding to the position of the bifurcation. Three smaller OGVs are positioned between two larger OGVs 32a. The larger OGVs, which may be referred to as opaque OGVs, have a stagger angle and a camber similar to the OGVs shown in FIG. 5. In the present embodiment, the camber and stagger angle is such that the flow line f of flow exiting a passage 56 defined between the larger OGV 32a and the smaller OGV 33a is exiting at an angle $\Theta_O$ that is twice the angle $\Theta_S$ of flow along a streamline that contours the bifurcation 38.

The smaller OGVs 33a, 33b which may be referred to as directional OGVs, have a chord length smaller than the chord length of the larger OGVs. In the present embodiment, the chord length of the smaller OGVs is a third of the chord length of the larger OGVs. As is understood in the art, the chord length of an aerofoil is the distance measured directly from the leading edge to the trailing edge. The smaller OGVs 33a, 33b are axially positioned in a region adjacent the trailing edge of the larger OGVs 32a. However, in alternative embodiments the smaller OGVs 33a, 33b may extend axially rearward past the trailing edge of the larger OGVs 32a, or may terminate before the trailing edge of the larger OGVs.

In the present embodiment, three smaller vanes 33a, 33b are provided between two larger outlet guide vanes 32a, but in alternative embodiments only one vane may be provided or two, four or more vanes may be provided. In the present example the smaller vanes are uniformly distributed in a circumferential direction. However, in alternative embodiments the smaller vanes can be distributed in a circumferentially non-uniform way so as to optimise the aerodynamic behaviour of each smaller passage.

The arrangement of the smaller OGVs, that is the stagger angle and the camber of the OGVs, is such that the smaller OGVs 33a adjacent the larger OGVs 32 encourage flow along the flow line f. That is, the OGVs 33a encourage flow to follow the axial side of the larger OGV within the passage 56 defined therebetween. The presence of the smaller OGV 33a reduces the stalled flow from the OGV and reduces aerodynamic losses that would otherwise be present (as in the comparative example shown in FIG. 5). The current arrangement results in the split of the large aggressive diffuser into four smaller conventional ones enabling the flow to stay attached, hence bringing lower losses than the stalled larger passages of the prior art (passage 1056 in FIG. 5).

The smaller OGV 33b positioned between the two other smaller OGVs 33a defines two passageways that direct flow around the bifurcation. The presence of the smaller OGV 33b further improves the aerodynamic performance of the engine.

Advantageously, the arrangement of the larger OGVs 32a and the smaller OGVs 33a, 33b, provides an improved balance between "masking" of the static pressure field formed immediately upstream of the bifurcation whilst limiting any impact on aerodynamic efficiency.

In the present embodiment, two bifurcations are provided, accordingly two sets of smaller OGVs 33a, 33b and larger OGVs 32a are provided.

Figure 6:
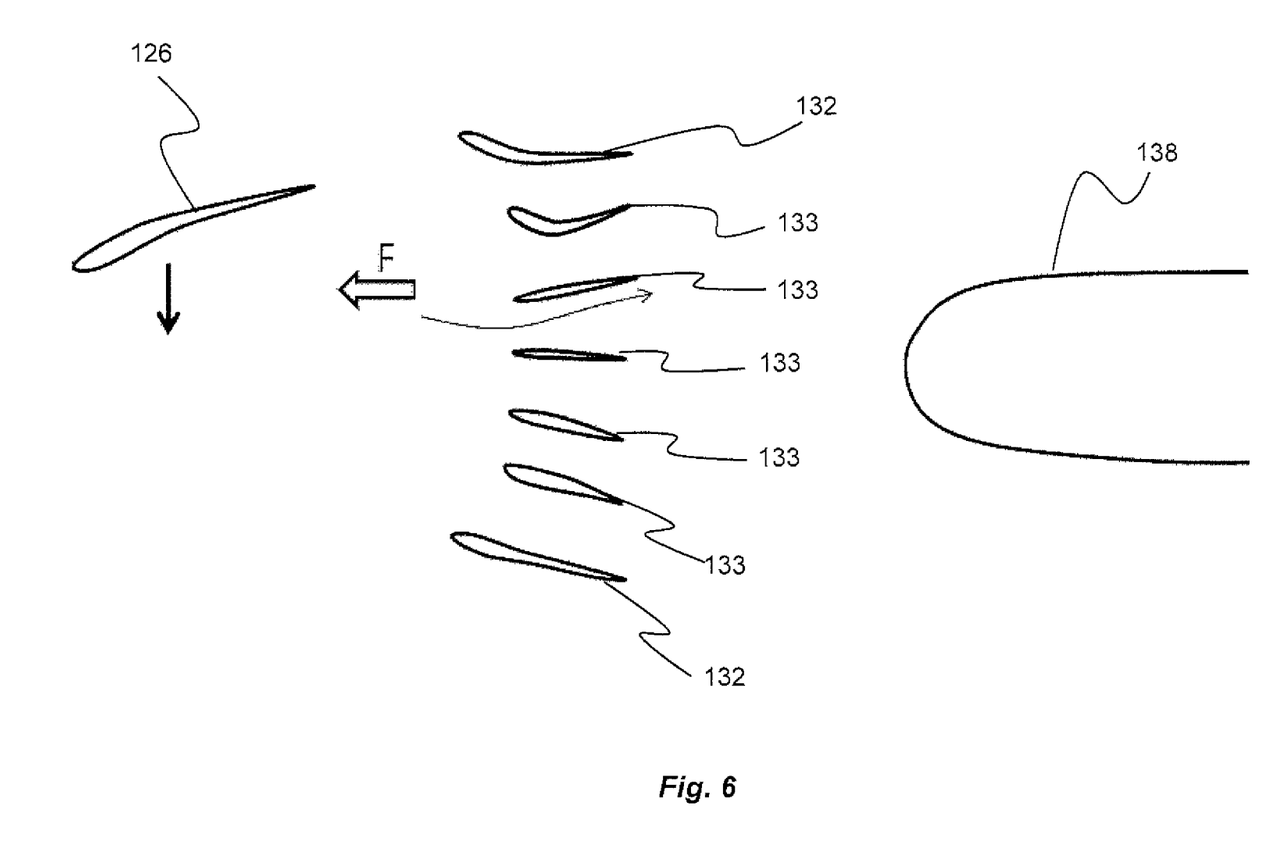
FIG. 6 illustrates a partial plan view of a fan blade, outlet guide vanes and a bifurcation of an alternative gas turbine engine.

Referring now to FIG. 6, a further alternative embodiment is shown. Only the principle differences between the embodiment of FIG. 6 and the embodiment of FIG. 4 will be discussed here. Similar features are given similar reference numerals but with a prefix "1" to distinguish between embodiments.

As in the previous embodiment, the gas turbine engine includes in flow series, a fan having fan blades 126, a series of guide vanes 132, 133 and a bifurcation 138.

In the present embodiment, the outlet guide vanes 133 in a region corresponding to the position of the bifurcation 138 are smaller (i.e. have a shorter chord length) than the remainder of the outlet guide vanes 132. As such, the smaller OGVs 133 can be considered as being positioned between two larger OGVs, as in the previous embodiment. However, the region corresponding to the position of the bifurcation, in the present embodiment, extends such that the circumferential extent of the bifurcation is between a half and two thirds of the circumferential extent of the region of the smaller vanes 133.

The smaller OGVs 133 have a chord length of between half and two thirds of the chord length of the remainder of the OGVs 132.

The stagger angle and the camber of the larger OGVs 132 that are adjacent the smaller OGVs 133 of the present embodiment is not as severe as the larger OGVs 32a of the embodiment of FIG. 4.

In the present embodiment five smaller vanes 133 are positioned in the region corresponding to the position of the bifurcation. In alternative embodiments, any suitable number of smaller vanes 133 may be used, but when using larger OGVs 132 that have a less severe camber (e.g. when the vanes are not considered to be opaque) it is thought that having four or more smaller vanes 133 is preferable.

The arrangement of outlet guide vanes 133, 132 shown in FIG. 5 has been found to reduce the forcing on the fan blades 126, and therefore reduce the vibration of the fan blades, whilst limiting the effect on the aerodynamic efficiency of the flow through the outlet guide vanes. This is thought to be due to the increased number of OGVs in the region corresponding to the position of the bifurcation, offering more surfaces and correspondingly more lift forces to turn the flow and guide it around the bifurcation.

It will be appreciated by one skilled in the art that, where technical features have been described in association with one or more embodiments, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

The invention claimed is:

1. A gas turbine engine comprising in flow series:
   a fan;
   a series of outlet guide vanes; and
   a bifurcation,
   wherein the outlet guide vanes are more densely distributed in a region circumferentially aligned with the bifurcation than in a region circumferentially offset from the bifurcation.

2. The gas turbine engine according to claim 1, wherein the outlet guide vanes positioned in the region circumferentially aligned with the bifurcation have a shorter chord length than the remainder of the outlet guide vanes.

3. The gas turbine engine according to claim 1, wherein one or more smaller outlet guide vanes are positioned between two larger outlet guide vanes in the region circumferentially aligned with the bifurcation, the one or more smaller outlet guide vanes having a shorter chord length than the larger outlet guide vanes.

4. The gas turbine engine according to claim 3, wherein the one or more smaller outlet guide vanes have a chord length equal to or between a half and a quarter of the chord length of the larger outlet guide vanes.

5. The gas turbine engine according to claim 4, wherein the one or more smaller outlet guide vanes have a chord length equal to about one third of the chord length of the larger outlet guide vanes.

6. The gas turbine engine according to claim 3, wherein the larger outlet guide vanes have a rearward camber angled to an axis parallel to the longitudinal axis of the gas turbine engine, the angle of the rearward camber from said axis being greater than the angle, from the axis parallel to the longitudinal axis, of a streamline flow contouring the bifurcation.

7. The gas turbine engine according to claim 6, wherein the larger outlet guide vanes have a rearward camber angled at twice the angle of the streamline flow contouring the bifurcation when measured from an axis parallel to the longitudinal axis of the gas turbine engine.

8. The gas turbine engine according to claim 6, wherein at least one of the one or more smaller outlet guide vanes is arranged to encourage flow along a flow line defined by at least one larger outlet guide vane.

9. The gas turbine engine according to claim 6, wherein at least two smaller outlet guide vanes are positioned between the larger outlet guide vanes.

10. The gas turbine engine according to claim 9, wherein at least three smaller outlet guide vanes are positioned between the larger outlet guide vanes.

11. The gas turbine engine according to claim 1, wherein the camber of the outlet guide vanes in a region circumferentially aligned with the bifurcation is such that the flow exiting the passage is at an angle less than twice that of the angle of a streamline that contours the bifurcation.

12. The gas turbine engine according to claim 1, wherein at least four outlet guide vanes are provided in the region circumferentially aligned with the bifurcation.

* * * * *